No. 648,605. Patented May 1, 1900.
E. BROOM.
KNIFE BOARD.
(Application filed Oct. 31, 1899.)

(No Model.)

WITNESSES:
Ella L. Giles

INVENTOR
Eliza Broom
ATTORNEYS

UNITED STATES PATENT OFFICE.

ELIZA BROOM, OF BRISTOL, ENGLAND.

KNIFE-BOARD.

SPECIFICATION forming part of Letters Patent No. 648,605, dated May 1, 1900.

Application filed October 31, 1899. Serial No. 735,396. (No model.)

*To all whom it may concern:*

Be it known that I, ELIZA BROOM, a subject of the Queen of Great Britain and Ireland, and a resident of 6 Leicester Villas, St. Paul's road, Clifton, Bristol, England, have invented certain new and useful Improvements in Knife-Boards, (for which I have made application for patent in Great Britain, dated October 2, 1899; in France, dated October 6, 1899; in Belgium, dated October 6, 1899, and in Germany, dated October 6, 1899,) of which the following is a specification.

My invention relates to knife-boards, and has for its object to provide a knife-cleaning board of simple construction, yet more convenient and efficient and requiring the exercise of less exertion in use than knife-boards as at present made.

According to my invention I form the knife-board of two boards one superposed upon the other, their working surfaces being contiguous and adapted to be pressed together and receive the knife-blade between them.

Figure 1:
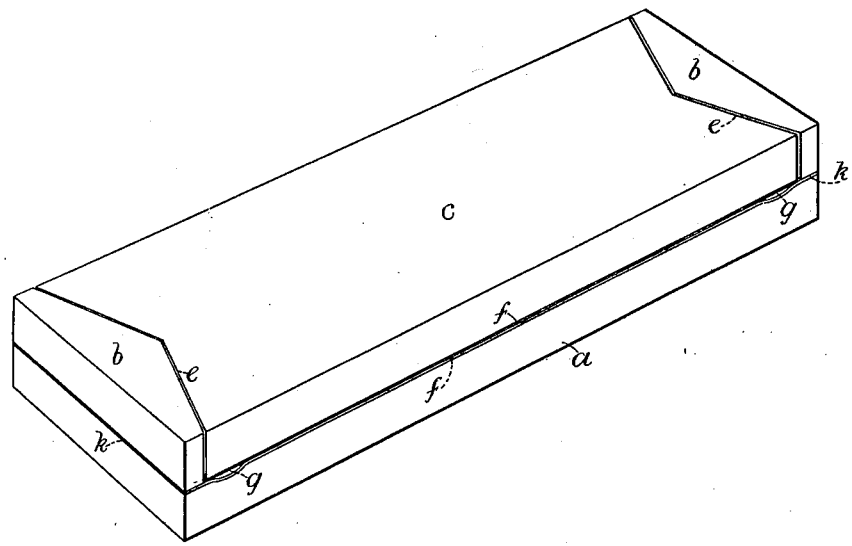
Figure 2:
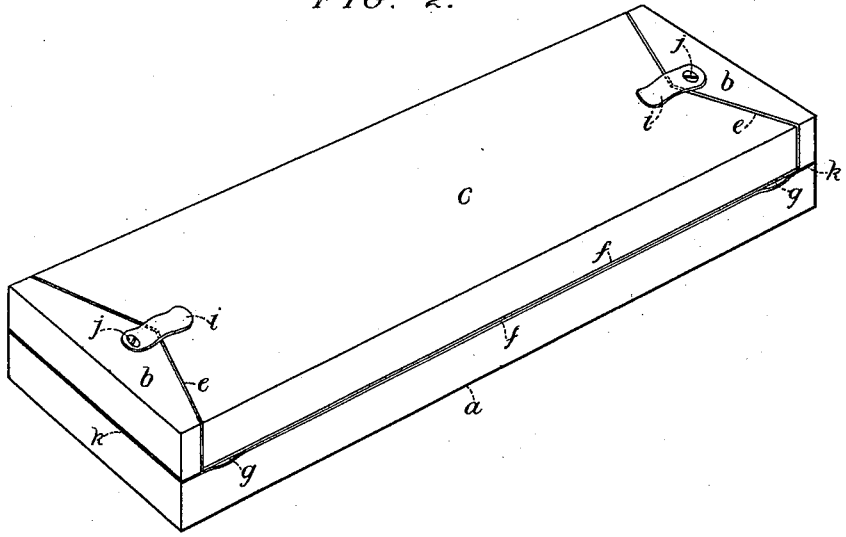

In the accompanying drawings, Figure 1 is a perspective view of a knife-board made in accordance with my invention, and Fig. 2 is a similar view showing a modification.

In Fig. 1 the base-board $a$ is provided with two raised end pieces $b\ b$, adapted to receive between them the upper board $c$, which is free and removable. To prevent any sideway movement of the board $c$ in use, the ends thereof are made of irregular or V-shaped form, as shown at $d\ d$, and the fixed ends $b\ b$ are reversely formed, as at $e\ e$, to receive same. The working surfaces $f f$ of the boards are contiguous, as shown, and in use the knife-blades are inserted between same and moved to and fro in the known manner, while pressure is applied to the free upper board $c$ by hand or weights, or otherwise, resulting in an even and readily-variable pressure on the knife-blade without any straining or twisting thereof, as is the case with ordinary knife-boards, at the same time enabling the work to be accomplished in an easy and convenient manner and both sides of the knife-blade being cleaned at one time. For convenience in inserting the knife-blade between the two boards recessed parts or flared openings $g\ g$ may be formed on one or both parts.

In some cases, as shown in Fig. 2, spring-clips $i\ i$ may be added and adapted to impart sufficient pressure to the free board $c$ to effect the cleaning of the knives. These clips may be of any suitable form and are adapted to be turned on the pivot $j$ when it is required to raise or remove the upper board $c$ for insertion of emery-powder or other cleaning medium.

The working surfaces $f\ f$ are of Brussels carpet or other suitable material secured to either board by glue or otherwise and, if required, clamped to the lower board between same and the end pieces $b\ b$, as shown at $k$.

Having now described my invention, what I claim as new, and desire to secure by Letters Patent, is—

1. The improved knife-board comprising the combination of a base $a$, end pieces $b\ b$ and free removable board $c$, the joint of the board $c$ and end pieces $b\ b$ being irregular or V-shaped as shown, substantially as set forth.

2. The improved knife-cleaning board comprising the combination of a base-board $a$, removable upper board $c$, the working surfaces between the boards, the raised end pieces $b\ b$ upon the base $a$ with irregular or V-shaped joint between same and the board $c$ and the spring-pressure clips $i\ i$ all arranged substantially as and for the purposes set forth.

In witness whereof I have hereunto signed my name in the presence of two subscribing witnesses.

ELIZA BROOM.

Witnesses:
 JOHN HUNT SYMES,
 JOHN EDWIN CHEESE.